United States Patent [19]

Sparks

[11] Patent Number: 4,494,454
[45] Date of Patent: Jan. 22, 1985

[54] TACO BOARD

[76] Inventor: Conrad Sparks, 12251 Haga St., Garden Grove, Calif. 92641

[21] Appl. No.: 358,696

[22] Filed: Mar. 16, 1982

[51] Int. Cl.³ .............................. A21B 5/02; A21B 5/08
[52] U.S. Cl. ...................................... 99/426; 249/175; 249/177; 425/458
[58] Field of Search .............. 425/458, 383, 470, 471, 425/469, 403; 249/175, 177, 195; 294/53.5, 49; 99/426

[56] References Cited

U.S. PATENT DOCUMENTS

| | | | |
|---|---|---|---|
| 1,058,465 | 4/1913 | Proffitt | 249/175 |
| 1,116,729 | 11/1914 | Potolsky | 294/49 |
| 1,264,640 | 4/1918 | Hall | 294/53.5 |
| 1,500,132 | 7/1924 | Hummelgard | 294/53.5 |
| 1,894,983 | 1/1933 | Eppensteiner | 249/175 |
| 2,775,929 | 1/1957 | Johnson et al. | 99/426 |
| 2,800,089 | 7/1957 | Seils | 294/49 |
| 2,840,013 | 6/1958 | Seils | 294/49 |
| 2,957,404 | 10/1960 | Richardson | 99/426 |

Primary Examiner—Willard E. Hoag

[57] ABSTRACT

A taco shell shaper including a shaping portion and a handle member. The shaping portion is affixed to the handle member with a roll pin so that handle member will swing eighty (80°) to either side of the shaping portion. An uncooked tortilla is wrapped around the shaping portion.

The user then places the tortilla and shaping portion in heated cooking oil which is approximately three-sixteenth (3/16) of an inch deep in a skillet so that one-half (½) the tortilla and one side of the shaping portion are heated in the oil. After that half of the tortilla is cooked, the user then flips the shaper portion with the handle member so that the other half of the tortilla and the other side of the shaper portion are immersed in the heated oil. After that side of the tortilla is cooked, the tortilla and taco shell shaper are removed from the oil and the cooked tortilla is then removed from the shaping portion. The cooked tortilla is now shaped for filling.

3 Claims, 22 Drawing Figures

FIG. 5
FIG. 6
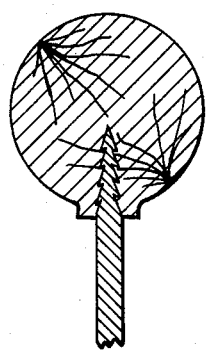
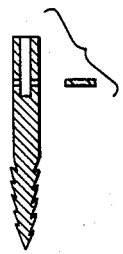
FIG. 7
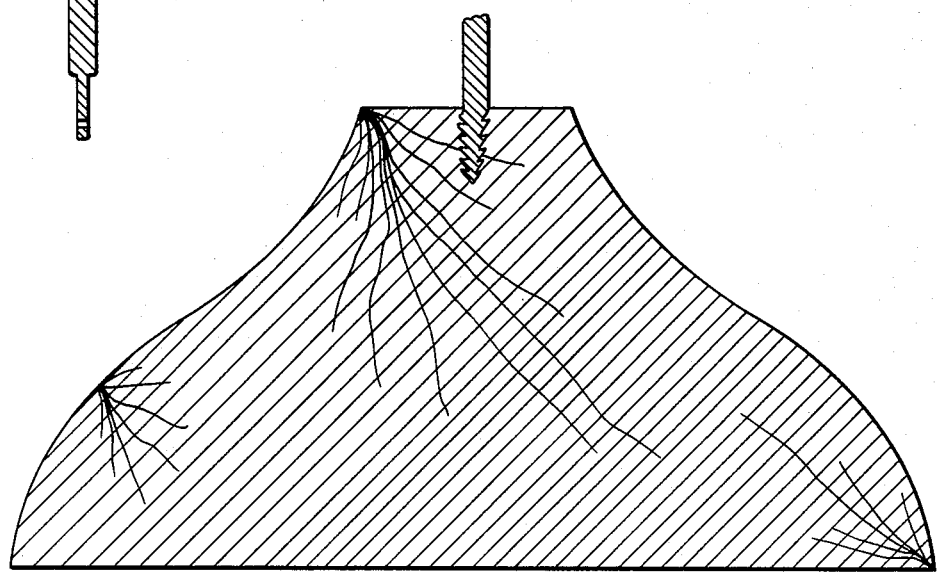
FIG. 8
FIG. 4

TACO BOARD

BACKGROUND

This invention relates to cooking utensils generally, and is designed for the sole purpose of making taco shells. The device was created to satisfy the need to make taco shells in a manner such that the shells would be shaped so they would not be broken when filled. This device also satisfies the need to be able to make taco shells in a very low level of oil and in skillets seven inches in diameter or larger and of any depth.

Traditionally taco shells were made by placing the tortilla shells in hot oil and then flipping or folding the tortilla in half. This method gets the taco shell made, but frequently the shell would be creased in such a sharp angle that it broke when being filled. Additionally, the shells made in this fashion varied drastically in the amount of filling that could be placed in them.

This invention is comprised of a shaping board and handle member. The handle member swings so that when the shaping board is placed on either side, the handle member can be placed in an upright position slightly less than perpendicular to the side of the shaping board.

One of the objects of the invention is to be able to make taco shells uniform in shape that provides adequate space for filling. Another object of the invention is to accomplish the above purpose with a device that requires a minimal amount of cooking oil and that can be used with any size skillet. Another object of the invention is to have no shell breakage once the tortilla has been cooked, and no tortilla breakage while or before the tortilla is cooked.

FIG. 4 is the top.

FIG. 5 is a section view—handle stem.

FIG. 6 is a section view—handle grip/handle stem connection.

FIG. 7 is a section view of the shaper portion anchor.

FIG. 8 is a section view of the shaper portion anchor placement in shaping board.

Figure 1:
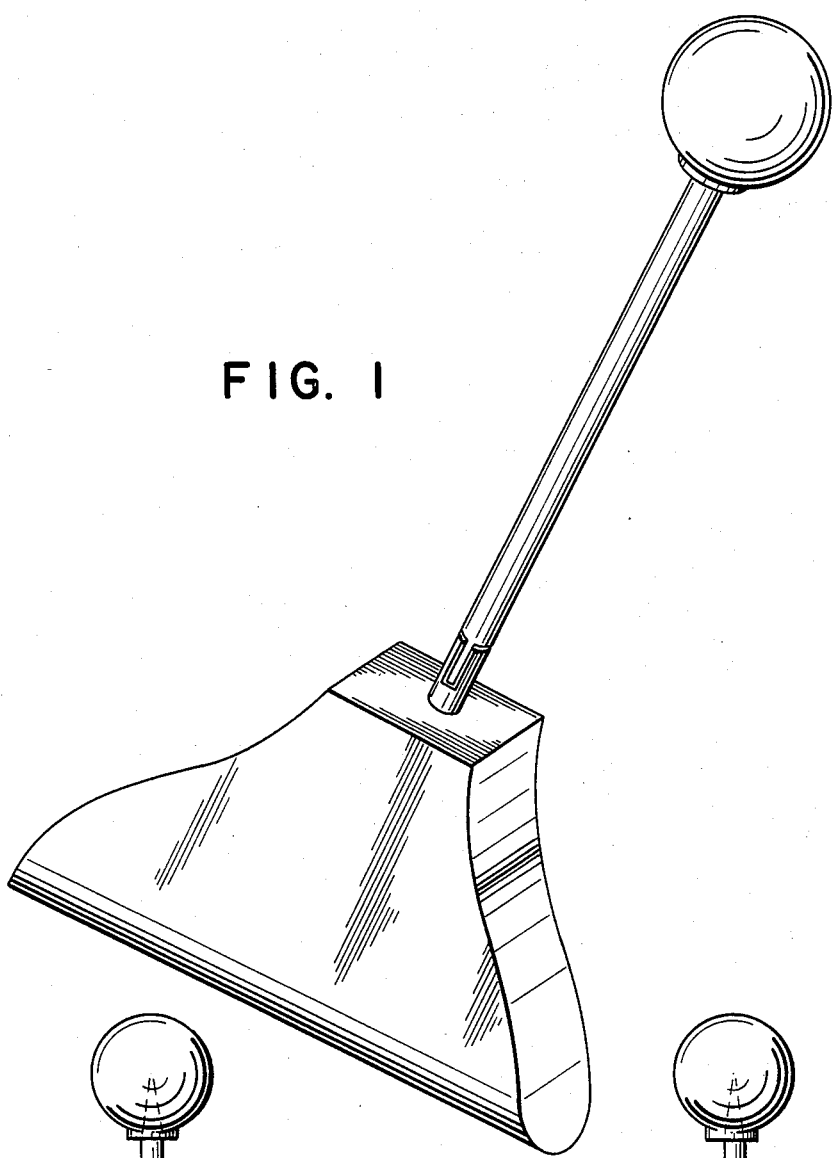
FIG. 1 is a perspective view of the taco shell shaper.
Figure 2:
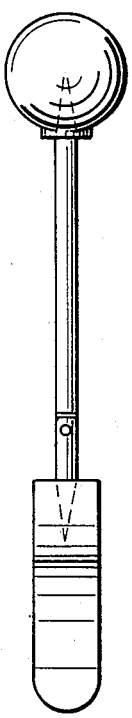
FIG. 2 is the front.
Figure 3:
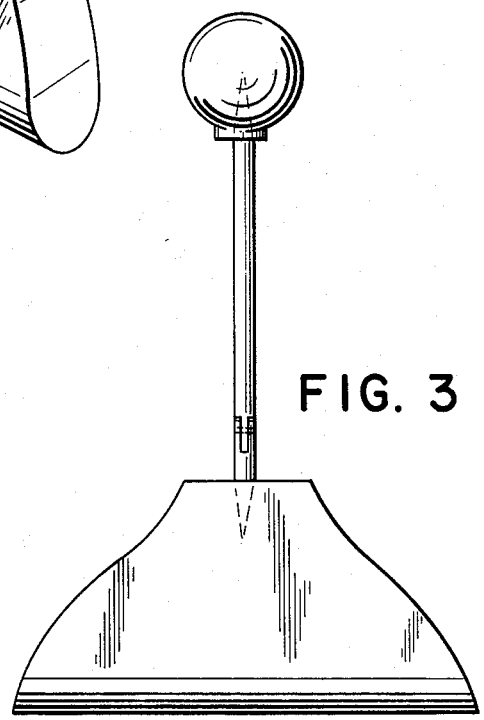
FIG. 3 is the side.

For the purpose of promoting an understanding of the principles of the invention, reference will now be made to the illustrations in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 9:
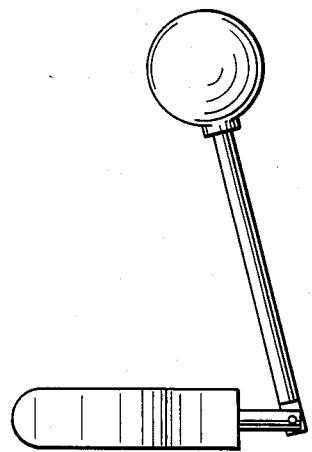
FIG. 9 is a right angle view of the handle member at 80° angle to the left side of the shaper board.
Figure 10:
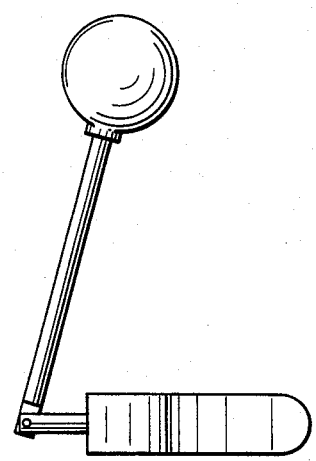
FIG. 10 is a right angle view of the handle member at 80° angle to the right side of the shaper board.

Referring to FIG. 1, there is illustrated a taco shell shaper 8. The taco shell shaper consists of a shaping portion 7 and a handle member 3. The handle member 3 is connected with a roll pin 5 to an anchor 6 which is connected to the shaping portion 7, so that the handle member can swing to an eighty degree (80°) angle to either side of the shaper portion as shown in FIGS. 9 and 10.

The anchor 6 can either be permanently set in the shaper portion 7 or screwed into place by having the anchor 6 appropriately threaded. The shaping portion is best made from hard type woods but can be made from stainless steel.

The handle member 3 is set in a grip 1 at 2. The grip is made of hardwood. The handle member 3 can be permanently set in the grip 1 or can be screwed in by having the member threaded as shown.

Figure 13:
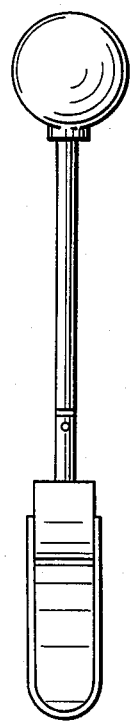
FIG. 13 is a right angle view of the shaper portion and handle member with a tortilla attached.
Figure 11:
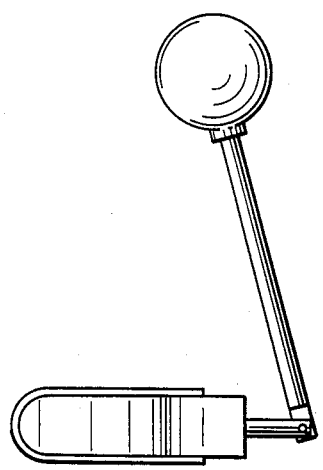
FIG. 11 is as 9 with a tortilla attached.
Figure 12:
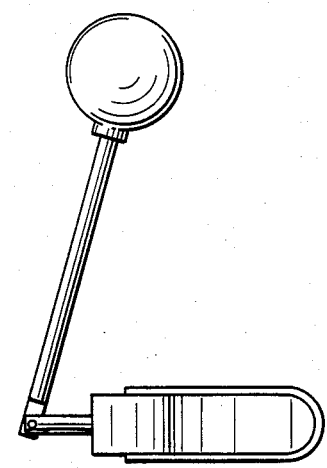
FIG. 12 is as 10 with a tortilla attached.

The invention is used by wrapping an uncooked tortilla around the shaper portion of the device and placing in hot cooking oil so that half the tortilla is in the oil as shown in FIGS. 13 and 12.

Figure 14:
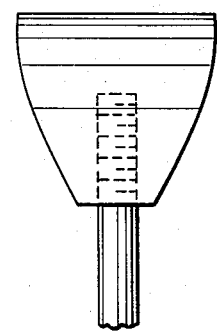
FIG. 14 is a section view of the handle member set in the handle grip.

FIG. 14 shows the handle stem 15 permanently affixed to the handle grip.

Figure 15:
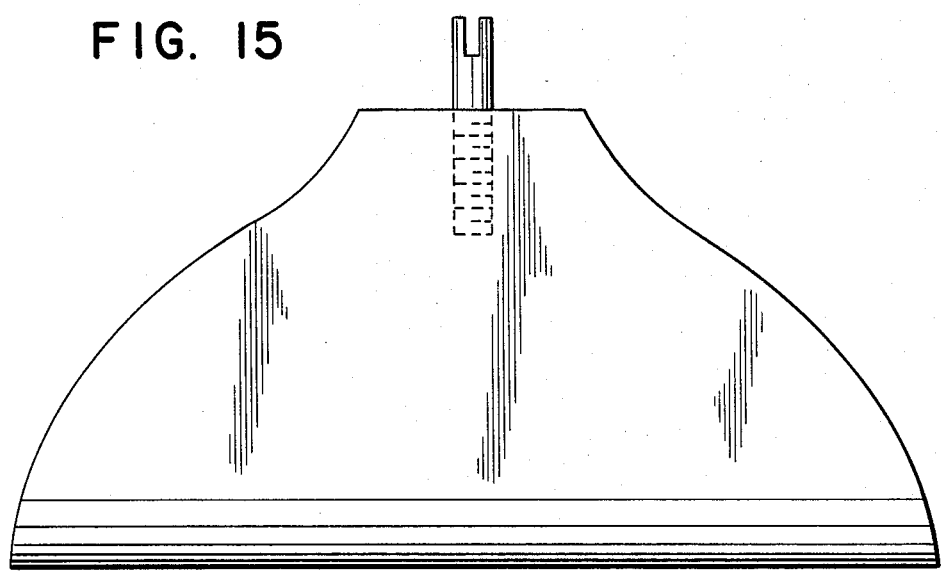
FIG. 15 is a section view of the shaper board anchor set in the shaper board.

FIG. 15 shows the shaping portion anchor permanently affixed to the shaping board.

Figure 16:
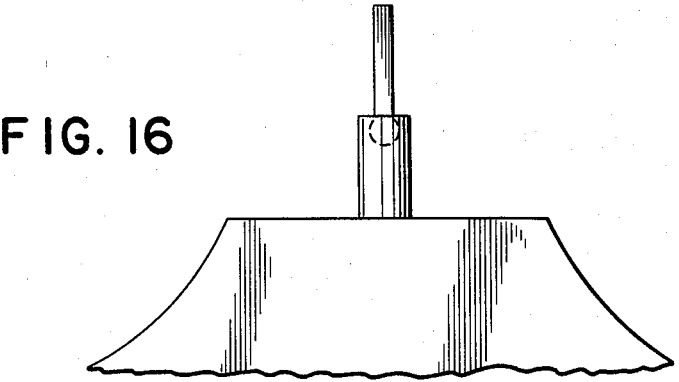
FIG. 16 is a section view of a ball socket connection of the handle member and shaper board anchor.

FIG. 16 shows a ball type socket for connecting the handle member and shaping board anchor.

Figure 19:
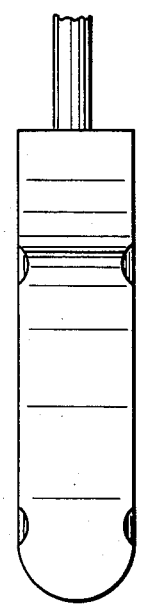
FIG. 19 is a section view of a grooved shaper board at right angle.
Figure 18:
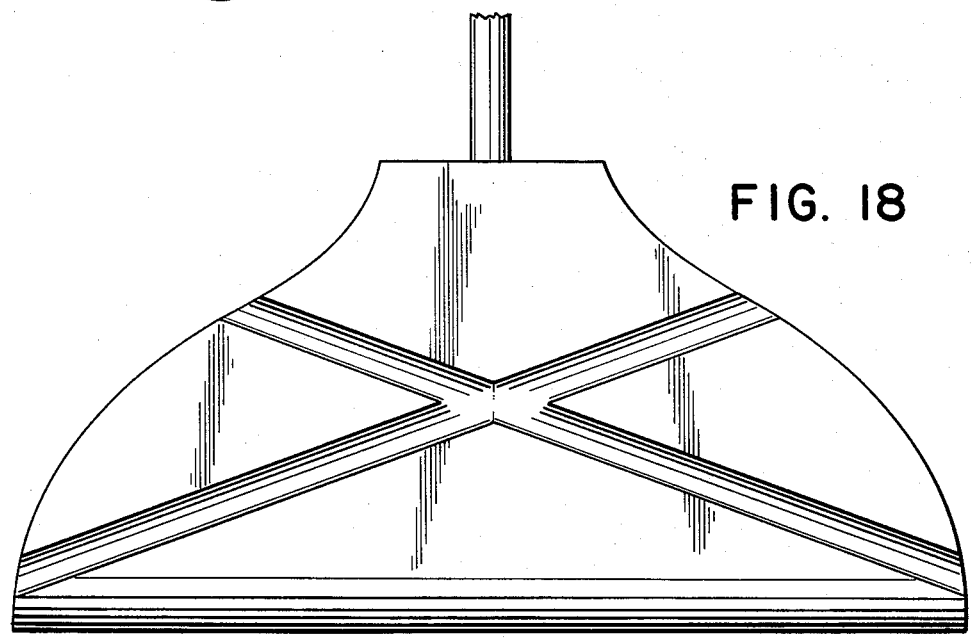
FIG. 18 is a section view of a grooved shaper board.

FIGS. 18 and 19 show a grooved shaping board for oil run-off.

Figure 20:
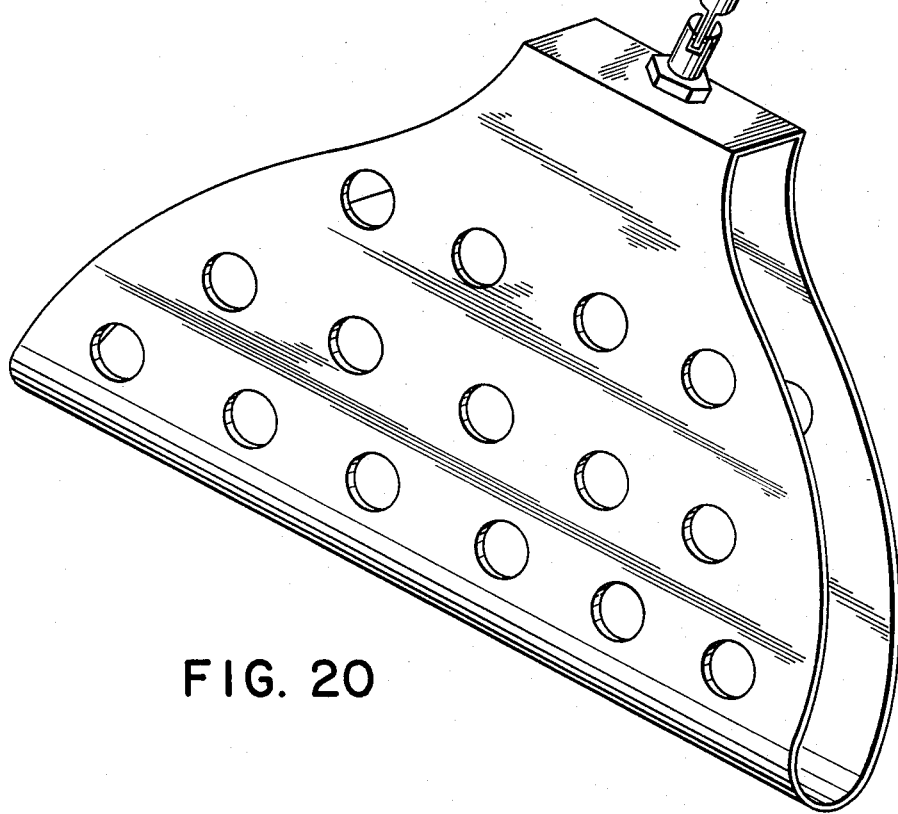
FIG. 20 is a section view of a metal shaper board with oil run holes.

FIG. 20 shows a hole filled metal shaping board with a machine thread nut and shaping board anchor.

The shaping board FIG. 1 is approximately 6 3/16 inches long 8.

Figure 17:
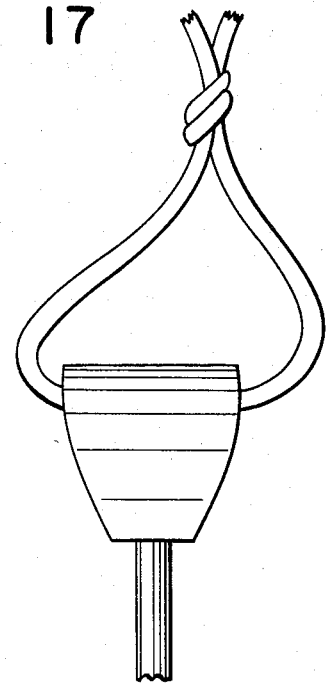
FIG. 17 is a section view of the handle member grip with a storage mechanism.

FIG. 17 shows a storage embodiment 9 located through the handle member grip 1 at point 10.

FIGS. 18 and 19 show oil run-off embodiments which are ¼ inch grooves running from point 11 to 12 and 13 to 14 on either side of the shaping board 7. FIG. 19 shows an end view of a shaping board 7 with oil run-off grooves on either side.

Figure 21:
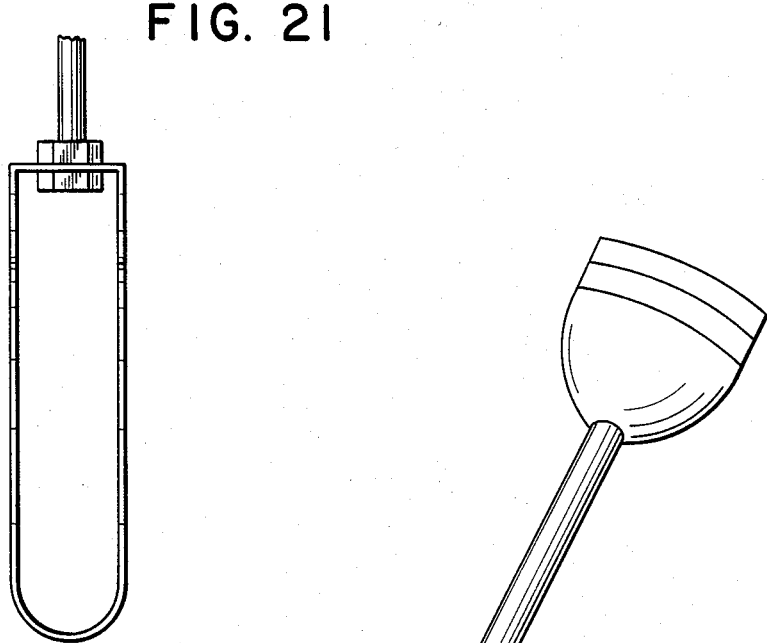
FIG. 21 is a section view of a metal shaper board with oil runs holes anchor at right angle.

FIG. 20 shows a metal shaping board 17 with oil run-off holes 18, and FIG. 21 shows a machine threaded bolt 19 fastened to a shaper board 17 anchor 20.

Figure 22:
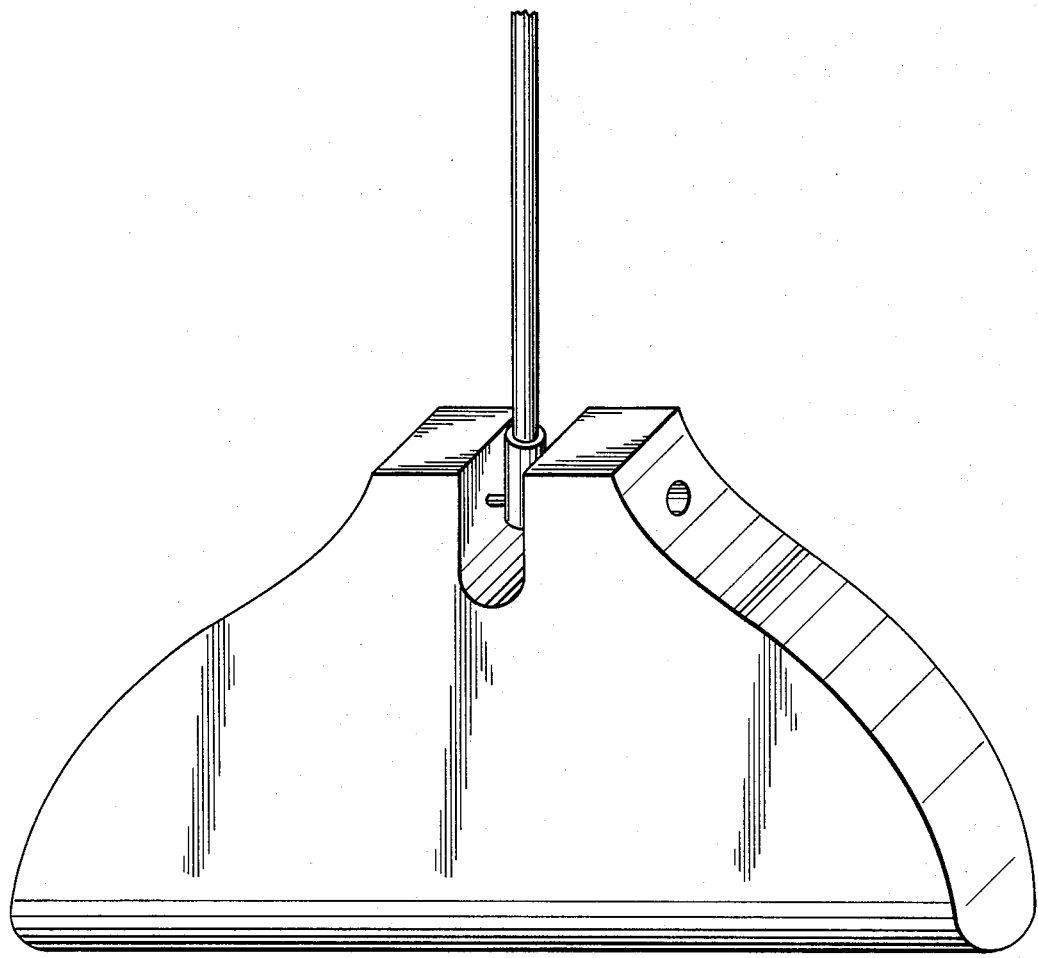
FIG. 22 is an isometric section view of a wood shaper board with a handle member connected.

FIG. 22 is a isometric section view of a wood shaper board with a handle member connected.

It is to be understood that although a wood and stainless steel taco shell shaper have been illustrated, the various features of the disclosed invention are equally well subject to other types of material and other various materials and connection techniques are possible.

While the invention has been illustrated and described in detail in the drawings and foregoing descriptions, the same is to be considered as illustrative and not restrictive in character.

What is claimed is:

1. A taco former, comprising:

A shaper member having two broad, opposed substantially flat surface portions connected by a flat side portion narrower than said broad, flat surface portions and disposed substantially perpendicularly to said substantially flat surface portions at edges thereof, a convex side portion opposite the narrow flat side portion, the convex side portion being convex about an axis substantially parallel to the narrow flat side and a handle member pivotally attached to said shaper member through a pivot pin disposed substantially parallel to the narrow substantially flat side portion, said shaper member having a thickness and shape such as to be suitable for forming tortillas into taco shells.

2. The taco former of claim 1, wherein at least one broad surface of said shaper member is grooved transversely so as to permit oil run-off.

3. The taco former of claim 1, wherein said shaper member is hollow and said broad, flat surface portions are perforated.

* * * * *